(12) United States Patent
Sammells

(10) Patent No.: US 8,980,459 B1
(45) Date of Patent: Mar. 17, 2015

(54) SECONDARY METAL CHALCOGENIDE BATTERIES

(71) Applicant: Dynantis Corporation, Santa Barbara, CA (US)

(72) Inventor: Anthony F Sammells, Santa Barbara, CA (US)

(73) Assignee: Dynantis Corporation, Santa Barbara, CA (US)

( * ) Notice: Subject to any disclaimer, the term of this patent is extended or adjusted under 35 U.S.C. 154(b) by 0 days.

(21) Appl. No.: 14/146,603

(22) Filed: Jan. 2, 2014

(51) Int. Cl.
| | |
|---|---|
| H01M 4/36 | (2006.01) |
| H01M 10/0561 | (2010.01) |
| H01M 10/04 | (2006.01) |
| H01M 10/054 | (2010.01) |
| H01M 10/36 | (2010.01) |

(52) U.S. Cl.
CPC .......... *H01M 10/0561* (2013.01); *H01M 10/04* (2013.01); *H01M 10/054* (2013.01); *H01M 10/36* (2013.01)
USPC ........................................ 429/103

(58) Field of Classification Search
CPC ........ Y02E 60/12; H01M 4/60; H01M 4/581; H01M 4/5815; H01M 10/39; H01M 10/3909; H01M 10/42; H01M 10/0563
USPC ............................. 429/62, 103, 104; 29/623.5
See application file for complete search history.

(56) References Cited

U.S. PATENT DOCUMENTS

| | | | |
|---|---|---|---|
| 3,877,984 A | 4/1975 | Werth | |
| 3,969,138 A | 7/1976 | Werth et al. | |
| 3,988,163 A | 10/1976 | Sklarchuk | |
| 4,452,777 A * | 6/1984 | Abraham et al. | 429/104 |
| 4,529,676 A | 7/1985 | Galloway et al. | |
| 4,626,483 A * | 12/1986 | Bones et al. | 429/50 |
| 4,833,048 A * | 5/1989 | Dejonghe et al. | 429/104 |
| 4,945,012 A | 7/1990 | Bugga et al. | |
| 4,945,013 A * | 7/1990 | Lim | 429/104 |
| 5,230,968 A * | 7/1993 | Bones et al. | 429/139 |
| 5,476,733 A | 12/1995 | Coetzer et al. | |
| 5,607,787 A | 3/1997 | Wedlake et al. | |
| 6,194,099 B1 * | 2/2001 | Gernov et al. | 429/213 |
| 8,343,661 B2 | 1/2013 | Galloway et al. | |

* cited by examiner

Primary Examiner — Stewart Fraser
(74) Attorney, Agent, or Firm — Lathrop & Gage LLP

(57) ABSTRACT

Cell and batteries containing them employing a transition metal chalcogenide positive electrode (cathode) in combination with a liquid alkali metal haloaluminate. At operating temperatures, the positive electrode (cathode) of the invention comprises a solid matrix comprising electroactive cathode material permeated with and in physical and electrical contact with liquid alkali metal haloaluminate electrolyte. The positive and negative electrodes are separated with a solid alkali metal conducting electrolyte. The transition metal chalcogenide is not in direct physical contact with the solid electrolyte. Electric and ionic conductivity between the solid electrolyte and the positive electrode is mediated by the liquid alkali metal haloaluminate electrolyte. More specifically, the cells are sodium/iron sulfide cells. Batteries of the invention are useful for bulk energy storage, particularly for electric utility grid storage, as well as for electric vehicle propulsion.

30 Claims, 2 Drawing Sheets

SECONDARY METAL CHALCOGENIDE BATTERIES

BACKGROUND OF THE INVENTION

There is a significant need in the art for improved secondary (rechargeable) batteries having high energy density, decreased cost, improved safety, reduced thermal management and improved stability of component supply. Batteries having such improved characteristics will be useful in a variety of applications and are of particular interest for electric utility grid storage.

Electric utilities are seeking more cost effective and efficient strategies to manage energy delivery to the grid. Peak demand is frequently met by the use of relatively expensive gas turbines, which at times of low demand remain idle. Ideally, base load electrical energy production could be operated at optimum peak efficiency, with demand variations being either absorbed or delivered using some form of energy storage. Pumped hydro (PH) technology, where water is reversibly pumped from a lower to higher elevation, has been employed for such energy storage, where round-trip efficiency is typically 68%. However, acceptable sites for implementation of PH energy storage, based upon location and environmental concerns, are now very limited. An alternatively is the use of large storage batteries, where round-trip energy conversion efficiencies can exceed that of PH, and wherein siting is not limited by geography. The market for storage batteries for this application is expected to grow, provided that battery costs are reduced and performance is increased. Major issues that are currently limiting implementation of advanced battery systems for grid storage include: overall cost for materials and associated hardware, long-term availability of materials, safety, achieving long cycle life and 5) thermal management during operation. The present invention provides an improved battery to meet these requirements. The batteries of the invention incorporate no toxic materials, and are generally safer than comparable battery systems (e.g., sodium-sulfur systems).

Improved secondary batteries will also provide particular benefit for applications to electric vehicles and their use will translate into greater range for such vehicles.

U.S. Pat. No. 3,988,163 relates to a secondary battery having a molten sodium negative reactant, a sulfur and mixture of metal halides positive reactant melt, a carbon powder dispersed within the positive reactant melt, a solid member separating the negative reactant and the positive reactant, and a molten electrolyte on the positive reactant side of the solid member which is said to comprise a molten sodium haloaluminate. The solid member is said to be selectively-ionically conductive to sodium cations. The positive reactant is said to comprise molten sulfur and a molten mixture of metal halides. The metal halides are required to be "soluble to some extent in the sodium haloaluminate electrolyte of the battery". Molten sodium haloaluminate is defined as "materials which include sodium halides, as for example, chlorides, bromides, fluorides, or iodides or sodium, and aluminum halides, for example, chlorides, bromides, fluorides or iodides of aluminum. Preferred metal halides are said to be aluminum chloride and antimony chloride. The positive reactant compartment of the battery is described as containing "electrolyte-sulfur mixture of metal halides positive reactant melt" and, more specifically as "sodium chloroaluminate-sulfur, aluminum chloride and antimony chloride melt. The battery is reported to operate at temperatures ranging from 150 to 225° C.

U.S. Pat. No. 3,877,984 relates to a secondary battery having a molten alkali metal negative reactant. a metal chloride positive reactant, a molten alkali metal chloraluminate electrolyte and a selectively-ionically-conductive separator positioned between the negative and the positive reactants. Metal chloride, sodium chloride and aluminum trichloride are combined in the positive reactant chamber and heat to form a melt. Exemplified metal chloride positive reactants included antimony chloride, ferric chloride and cupric chloride. The battery is reported to operate at temperatures ranging from 180 to 200° C.

U.S. Pat. No. 4,452,777 relates to an electrochemical cell having a sodium anode assembly, an alkali metal aluminum tetrahalide electrolyte where the cathode material is a transition metal chalcogenide or a reaction product of the chalcogenide with the electrolyte. The cathode material is described as being dispersed on a substrate which is inert under cell operating conditions. Exemplary substrates are carbon felt and nickel mesh. The preferred transition metal chalcogenide is reported to be $VS_2$. Exemplary cells are reported to be operated at 165° C. or 170° C.

U.S. Pat. No. 5,476,733 reports a high temperature (200-400° C.) rechargeable electrochemical power storage cell where the anode compartment contains sodium active anode material, and the cathode compartment contains a sodium aluminum chloride molten salt electrolyte and a solid cathode comprising an electrolyte permeable porous matrix impregnated with the molten salt electrolyte which has solid active cathode material dispersed therein. The cell is operated at a temperature where sodium and the molten salt electrolyte are molten. The electrolyte is described as "a substantially equimolar mixture of sodium chloride and aluminium chloride in which the proportion of aluminium chloride in all states of charge is at most 50% on a molar basis." The active cathode material is described as comprising at least one transition metal selected from the group consisting of Fe, Ni, Cr, Co, Mn, Cu and Mo having, dispersed therein, at least one additive element. In the description and the examples, the at least one additive element is said to be selected from the group consisting of As and Sb where the atomic ratio of transition metal to additive element in the active cathode material being 90:1-30:70. Only in the Abstract is the additive element said to be selected from the group consisting of As, Bi, Sb, Se and Te. The cathode is further described as "may contain, in addition, 2-12% by mass, based on the charged active cathode material, of sodium fluoride dopant and/or a sulfur-containing dopant whose sulfur forms 0.3-5% of the charged active cathode material by mass."

U.S. Pat. No. 8,343,661 reports a rechargeable electrochemical cell having a cathode composition comprising certain transition metals, alkali halometallate, alkali halide, a source of Zn and a source of chalcogenide. The source of Zn and that of chalcogenide is reported to may be effective to improve the extractive capacity of the cell and to decrease cell resistance. Operating temperatures for the cell are reported to range from 200 to 500° C.

While electrochemical cells employing cathode materials which comprise chalcogenides have been reported, there remains a significant need in the art for electrochemical cells, particularly those that are rechargeable, which exhibit properties useful in a given application, such as useful levels of charge capacity and useful levels of energy density, which can be operated at practically useful temperatures, and which have enhanced safety and decreased cost. The present invention provides such electrochemical cells.

SUMMARY OF THE INVENTION

This invention relates to batteries employing a metal chalcogenide/carbon positive electrode (cathode) in combination with a liquid alkali metal haloaluminate, particularly an alkali metal chloroaluminate, e.g., $NaAlCl_4$, particularly those in which the cathode is combined with an alkali metal negative electrode (anode) of the corresponding alkali metal. More specifically, the invention relates to alkali metal/transition metal chalcogenide batteries, more specifically to sodium/transition metal sulfide batteries and yet more specifically to sodium/iron sulfide batteries. Batteries of the invention are useful for bulk energy storage, particularly for electric utility grid storage, as well as for electric vehicle propulsion. At operating temperatures, the positive electrode (cathode) of the invention is a porous solid comprising electroactive cathode material permeated with and in physical and electrical contact with liquid alkali metal haloaluminate electrolyte.

In an embodiment, the invention provides an electrochemically reversible transition metal chalcogenide positive electrode and storage cells containing the electrode. In a specific embodiment, the electrolyte permeated positive electrode material is retained within a metal mesh. In specific embodiments, the invention relates to storage cells having an alkali metal negative electrode in combination with the reversible alkali metal/metal chalcogenide positive electrode. More specifically, the invention provides storage cells wherein the alkali metal electrode comprises liquid alkali metal and in particular embodiments, is a liquid sodium electrode. More specifically, the invention provides storage cells wherein the transition metal chalcogenide is a transition metal sulfide and more particularly is iron sulfide and wherein the liquid electrolyte is molten sodium chloroaluminate. In specific embodiments, the positive electrode further comprises a dispersed conductive material, for example carbon particles.

The positive and negative electrodes of the cell are separated by a dense (non-porous) alkali metal cation-conducting solid electrolyte (also termed a separator). In specific embodiments, the dense (non-porous)alkali metal cation-conducting solid electrolyte conducts sodium cation. More specifically, the metal cation-conducting material is a β-alumina (beta alumina) which conducts an alkali metal cation. More specifically, the metal cation-conducting material is a β"-alumina (beta double prime alumina) which conducts an alkali metal cation or an alkaline earth metal cation. In specific embodiments, the metal cation-conducting material conducts an alkali metal cation (e.g., Li+ or Na+). In specific embodiments, a cell of this invention includes a solid electrolyte (e.g., beta-alumina or beta double prime alumina) element (a sheet, layer or tube) having a thickness ranging from 0.5 to 3 mm, or more preferably having a thickness of 0.5 to 1.5 mm. In specific embodiments, the solid electrolyte of the invention is in the form of a receptacle, such as a tube, to retain liquid electrolyte and the positive electrode.

The metal chalcogenide of the positive electrode is not in direct physical contact with the dense metal cation-conductive solid electrolyte, and is not in direct physical contact with the source of the alkali metal of the negative electrode. The matrix of the positive electrode is, however, in electrical/ionic contact with the dense alkali metal cation conductive solid electrolyte via the molten metal salt electrolyte. Preferred negative electrodes are liquid metal (molten metal) electrodes, particularly liquid sodium electrodes.

The positive electrode is a solid matrix containing electroactive material which is permeated with molten alkali haloaluminate electrolyte. Alkali metal cations mediated through the dense alkali metal cation-conducting electrolyte enter the matrix of the positive electrode via the molten alkali metal salt electrolyte. The electrolyte permeated matrix of the positive electrode receives, on cell discharge, alkali metal cations from the negative electrode through the solid and liquid electrolytes which react with metal chalcogenide anions formed in the matrix. Discharge products formed largely on reaction of metal cations and metal chalcogenide anions are retained within the electrolyte permeated matrix. In specific embodiments, the cell is rechargeable and on recharging, the discharge products react largely to form metal cations and metal chalcogenides, particularly iron sulfides, which respectively return to the negative and positive electrodes. In specific embodiments, the liquid electrolyte of the cell is $NaAlCl_4$.

In specific embodiments, the cell of this invention is operated at a temperature at which the alkali metal haloaluminate electrolyte is liquid. In other specific embodiments, the cell of this invention is operated at temperatures at which both the alkali metal haloaluminate electrolyte and the alkali metal of the negative electrode are molten or liquid. In a specific embodiment, the cell is operated at a temperature between about 150 to 350° C. In another embodiment, the cell is operated at a temperature between about 150 to 300° C. Yet more specifically, the cell is operated at a temperature between 225 to 275° C.

The invention provides a battery comprising one or more storage cells of this invention. In such a battery the storage cells may be electrically connected in series, in parallel or both, as is known in the art.

The invention also provides a method for producing a storage cell comprising:
forming a negative electrode comprising alkali metal or an alkaline earth metal forming a porous positive electrode comprising metal chalcogenide permeated with a liquid metal salt electrolyte;
positioning a dense, alkali metal or alkaline earth metal ion-conductive solid electrolyte between the negative electrode and the liquid electrolyte.

In a specific embodiment, the electrolyte permeated matrix of the positive electrode is formed within a conductive holder, for example, a conductive mesh holder, particularly a metal mesh holder. This embodiment provide particular benefit for safety because it minimizes the risk of violent reaction between positive electroactive materials and liquid In specific embodiments, the positive electrode comprises carbon dispersed in the matrix of the positive electrode.

In a more specific embodiment, the dense layer of the alkali metal-ion conductive mixed metal oxide is in the form of a one-end closed tube for receiving liquid alkali metal salt electrolyte in contact with the porous matrix of the positive electrode.

The invention further provides a method for generating energy, comprising discharging one or more cells of the invention. The invention further provides a method for generating energy which comprises forming one or more cell of this invention and discharging the one or more cells. In specific embodiments, the cells of the invention are rechargeable and the methods for generating energy further comprise a step of storing electrical energy which comprises recharging the one or more cells after discharge.

The invention further provides a battery for use in electric utility grid storage which comprises one or more cells of this invention.

The invention further provides a battery for use in an electric vehicle which comprises one or more cells of this invention.

In embodiments, the invention provides a storage cell comprising:
a negative electrode comprising liquid alkali metal;
a positive electrode having a matrix comprising transition metal chalcogenide;

a liquid alkali metal haloaluminate electrolyte; and a solid alkali metal conducting separation element intermediate between the negative electrode and the liquid alkali metal haloaluminate electrolyte; wherein the liquid alkali metal haloaluminate electrolyte permeates the matrix of positive electrode and the transition metal chalcogenide of the positive electrode is not in direct physical contact with the solid alkali metal conducting separation element. In an embodiment, the matrix of the positive electrode is retained in the cell in a conductive container or receptacle. In an embodiment, the transition metal chalcogenide of the cell is iron sulfide. In an embodiment, the liquid alkali metal negative electrode of the cell is a liquid sodium negative electrode and the liquid electrolyte is sodium haloaluminate. In an embodiment, the electrolyte is sodium chloroaluminate. In an embodiment the electrolyte is $NaAlCl_4$. In an embodiment, the matrix of the positive electrode comprises 50 wt % of iron sulfide or more. In an embodiment, the matrix of the positive electrode further comprises carbon. In an embodiment, the positive electrode comprises carbon ranging from 5 to 15 wt %, $NaAlCl_4$ ranging from 10 to 20 wt % of the mixture and $FeS_2$ ranging from 85 to 65 wt % of the mixture.

In embodiments, the battery comprising a plurality of cell of the embodiments of the preceding paragraph.

In embodiments, the invention provided a method for producing a storage cell comprising:

forming a negative electrode comprising liquid alkali metal;

forming a positive electrode comprising a matrix of transition metal chalcogenide permeated with a liquid alkali metal haloaluminate electrolyte;

positioning a dense, alkali metal cation-conductive solid electrolyte between the negative electrode and the positive electrode; and providing a liquid alkali metal haloaluminate electrolyte in physical and electrical contact between the alkali metal cation-conductive solid electrolyte and the matrix of the positive electrode. In embodiments, the matrix of the positive electrode is formed by combining alkali metal haloaluminate with the transition metal chalcogenide and heating the mixture to melt the alkali metal haloaluminate. In an embodiment, the transition metal chalcogenide is iron sulfide. In an embodiment, the alkali metal haloalumoinate is $NaAlCl_4$. In an embodiment, the matrix is formed within a conductive container. In an embodiment, the matrix is formed having an embedded current collector. In an embodiment, the cell is rechargeable. In an embodiment, the alkali metal is sodium.

The invention also provides a method for generating energy, comprising forming one or more cells of any embodiments herein and discharging the one or more cells. In an embodiment, the method further comprises a step of storing electrical energy wherein the one or more cells are rechargeable and wherein after discharge the one or more cells are recharged by application of a voltage to the cell.

Other aspects and embodiments of the invention will be apparent on review of the detailed description and the figures herein.

DESCRIPTION OF THE INVENTION

Figure 1:
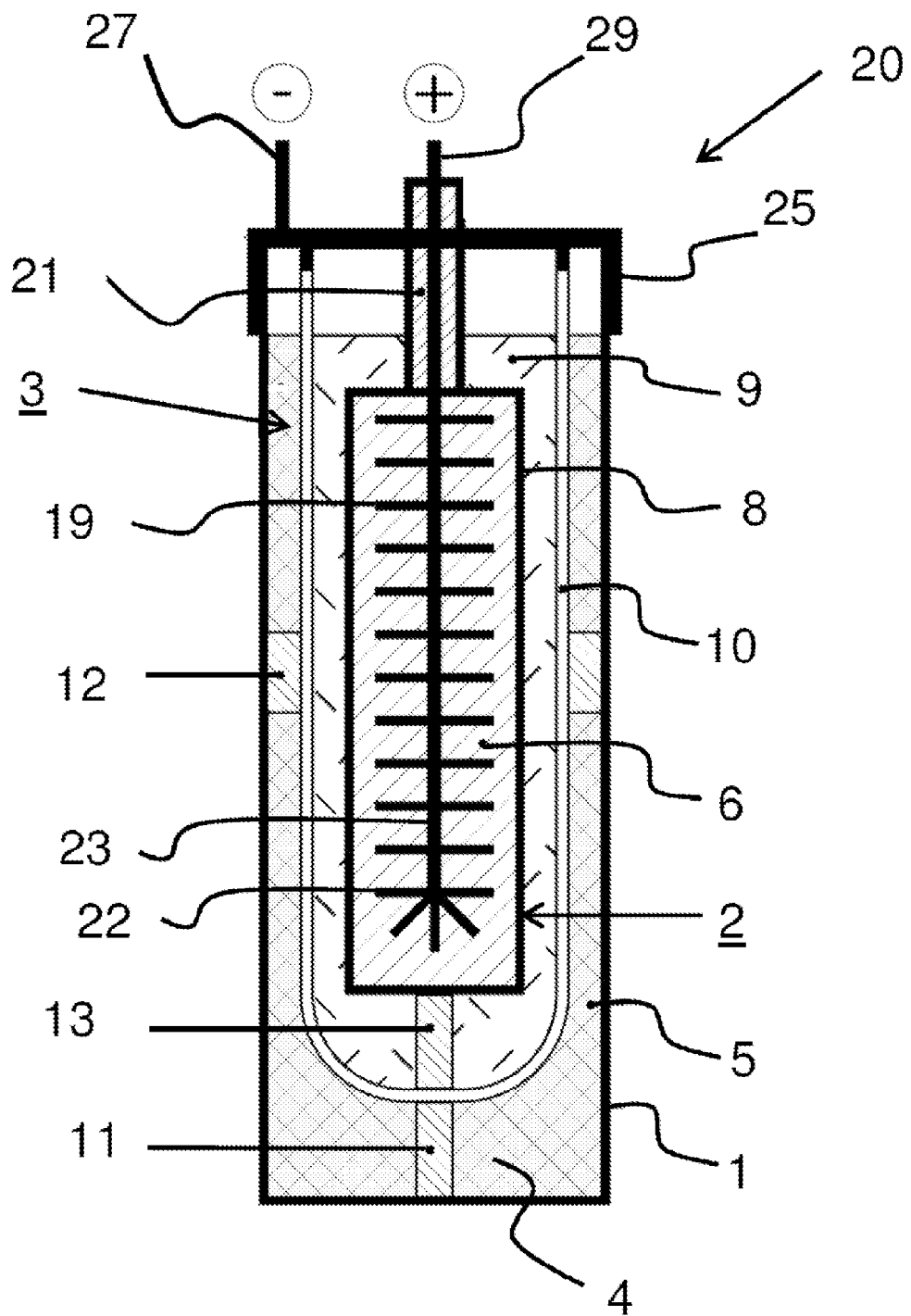
FIG. 1 is a schematic illustration of an exemplary electric storage cell of this invention. The exemplary cell is illustrated in a tubular geometry. It will be appreciated that various other cell geometries can be implemented with the cell components as described herein.

The present invention is based at least in part on use of a transition metal chalcogenide positive electrode permeated with an alkali metal haloaluminate electrolyte which is a liquid at cell operating temperatures and its combination with a liquid alkali metal negative electrode. In a cell, the positive and negative electrodes are separated by an alkali metal conductive solid electrolyte in physical and electrical contact with the liquid alkali metal of the negative electrode and with a reservoir of the liquid electrolyte.

The positive electroactive materials of the positive electrode comprising the transition metal chalcogenide are formed into a matrix which is permeated with the electrolyte. In a specific embodiment, a conductive material, such as carbon, is dispersed in the matrix. In a specific embodiment, the positive electrode matrix is formed by homogenously combining the transition metal chalcogenide, carbon or other conductive material and solid alkali metal haloaluminate and thereafter raising the temperature of the combined materials above the melting temperature of the alkali metal haloaluminate forming a solid matrix permeated with liquid electrolyte. It will be appreciated that the matrix of the positive electrode can also be prepared by mixing appropriate metal chalcogenides, including for example alkali chalcogenides, metal halides and aluminium halides in the appropriate stoichiometry to achieve the desired components of the matrix followed by heating of the mixture to liquefy electrolyte. It is currently believed that employing such methods, pores are formed within the electroactive material as the electrolyte is liquefied.

In a specific embodiment, the combined transition metal chalcogenide, carbon and electrolyte are introduced into an electronically conductive container or receptacle prior to melting the electrolyte. This container or receptacle retains the electropositive materials and allows electrolyte to be in physical and electrically connection with the matrix, but avoids or minimizes physical contact of electropositive materials (e.g., chalcogenide) with the solid electrolyte (separator). In a specific embodiment the container or receptacle is a metal mesh. Alternatively or in combination, the combined materials are formed into a desired shape prior to melting the electrolyte. Alternatively or in combination, a current collector is embedded within the matrix prior to heating the materials.

The components of the positive or negative electrode involved in the electrochemistry of discharge and charging of the cell are termed electroactive. The electrochemistry believed to occur during discharge and charging of the cells of this invention are illustrated for a sodium/iron sulfide system as follows:

$$2Na \rightarrow 2Na^+ + 2e^-$$

$$FeS_2 + 2Na^+ + 2e^- \rightarrow Na_2FeS_2$$

$$2Na + FeS_2 \leftrightarrows Na_2FeS_2 \; 2.0 \; V$$

This exemplified system possesses theoretical energy density of 650 We/kg or 1430 Wh/lb. Analogous electrochemical equations can be written for systems containing other transition metal chalcogenides and other alkali metals. The equations listed above are believed to illustrate the at least predominant electrochemistry occurring on discharge/charge of the cells of this invention. The positive electrode contains or is in contact with liquid salt electrolyte, alkali metal haloaluminate and that species therein may react with transition metal or chalcogenide to generate chemical reaction products. It will be appreciated that the additional electrochemical reactions may occur between the transition metal chalcogenide components and components of the electrolyte (e.g., aluminium halide, alkali metal halide) or with any chemical reaction products in the system. Any such additional electrochemical reactions are currently believed to at most make a minor contribution to the electrochemistry of the system.

The electroactive cathode material is predominantly (50% by weight or more) a transition metal chalcogenide, particularly a transition metal sulfide and more particularly iron sulfide. In specific embodiments, the electroactive cathode material is 99% by weight or more of the transition metal chalcogenide. In specific embodiments, the active cathode material is 95% by weight or more of the transition metal chalcogenide. In other embodiments, the active cathode material is 75% by weight, 85% by weight, or 90% by weight or more of the transition metal chalcogenide. In specific embodiments, the electroactive cathode material is 99% by weight or more of iron sulfide. In other embodiments, the active cathode material is 75% by weight, 85% by weight, or 90% by weight or more of iron sulfide. In specific embodiments, the chalcogenide is present in the cathode material at a level greater than 10 wt %. In specific embodiments, the chalcogenide is present in the cathode material at a level greater than 25 wt %. In specific embodiments, the sulfide is present in the cathode material at a level greater than 10 wt %. In specific embodiments, the sulfide is present in the cathode material at a level greater than 25 wt %. The cathode material of the invention contains at most trace amounts of Sb or As. In specific embodiments, the cathode material of the invention contains at most trace amounts of Bi. In specific embodiments, the cathode material of the invention does not contain Sb, As or Bi. In specific embodiments, the active cathode material of the invention contains at most 5% by weight of Se, Te or any combination thereof. In specific embodiments, the electroactive cathode material of the invention contains at most 0.1% by weight of Se, Te or any combination thereof. In specific embodiments, the electroactive cathode material of the invention contains at most 0.1% by weight of Se, Te or any combination thereof. In specific embodiments, the electroactive cathode material of the invention contains at most 0.01% by weight of Se, Te or any combination thereof. In specific embodiments, the electroactive cathode material of the invention contains at most 0.001% by weight of Se, Te or any combination thereof.

In specific embodiments, the electroactive cathode material of the invention does not contain Se or Te. In specific embodiments, the cathode material contains less than 0.01 wt % of Zn. In specific embodiments, the cathode material contains less than 0.001 wt % Zn. In specific embodiments, the cathode material contains less than 0.01 wt of Ni. In specific embodiments, the cathode material contains less than 0.001 wt % Ni. In specific embodiments, the cathode material contains less than 0.01 wt % of V. In specific embodiments, the cathode material contains less than 0.001 wt % V. In specific embodiments, the cathode material contains less than 0.01 wt % of any transition metal other than Fe. In specific embodiments, the cathode material contains less than 0.001 wt % of any transition metal other than Fe.

The positive electrode materials comprise electroactive material, here transition metal halochalcogenide (e.g., iron sulfide), alkali metal haloaluminate, and optionally a dispersed conductive material, such as carbon. As noted above a combination of such components is mixed, optionally shaped, optionally introduced into a receptacle and optionally provided with an embedded current collector. The weight ratio of transition metal chalcogenide to alkali metal haloaluminate in such mixtures ranges from 2 to 10 and more specifically from 3 to 9. When present as particles, the dispersed conductive material in the mixture ranges from 1 wt % to 25 wt %, more specifically from 5 wt % to 15 wt % and yet more specifically from 7 wt % to 12 wt %. The mixtures can optionally also contain relatively low levels 10 wt % or less (more specifically 5 wt % or less) of electrochemically inactive materials to facilitate mixing, processing or shaping of the mixtures. Mixtures optionally contain alkali metal halide salts or aluminum halide salts, particularly NaCl and/or $AlCl_3$. If present, such salts are at relatively low total levels less than 10 wt %, less than 5 wt %, or less than 1 wt %. In specific embodiments, the mixtures contain NaF at a level of 10 wt % or less. In specific embodiments, the mixtures do not contain NaF. In specific embodiments, the mixtures do not contain any sulfur-containing compound other than a transition metal or alkali metal sulfide.

The cell of the invention contains liquid electrolyte in addition to that which permeates the matrix of the positive electrode. In general the amount of electrolyte in the cell relative to electroactive component is such that the cell capacity is not limited by the electrolyte. A useful molar ratio of alkali metal haloaluminate to transition metal chalcogenide is 2 or higher. The relative amounts of positive electro active material to electrolyte can be readily adjusted to avoid limitation of cell capacity.

The liquid electrolyte of the invention is an alkali metal haloaluminate. The alkali metal of the electrolyte comprises the alkali metal of the negative electrode. The preferred alkali metal of the electrolyte and of the negative electrode is sodium. The alkali metal haloaluminate is preferably an alkali metal chloroaluminate and more preferably is a sodium chloroaluminate. In embodiments, the electrolyte is an alkali metal chloro tetraaluminate, and particularly is $NaAlCl_4$. In embodiments, the molar ratio of alkali metal to aluminum in the electrolyte ranges from 0.8 to 1.2. In embodiments, the molar ratio of alkali metal to aluminum in the electrolyte ranges from 0.9 to 1.1. In embodiments, the molar ratio of alkali metal to aluminum in the electrolyte ranges from 0.95 to 1.05. In an embodiment, the molar ratio of alkali metal to aluminum is about 1.

The term "matrix" is used to describe a component of the storage cells herein. This term does not herein imply any particular structure or shape. Nor does the term imply any particular structure of channels or pores within the matrix. The matrix of the positive electrode as formed by methods described herein is believed to be a porous solid matrix homogenously permeated with liquid electrolyte. The term matrix as used herein is not intended to encompass a dispersion on or coating of a substrate with transition metal chalcogenide. The electrolyte permeated positive electrode matrix is electrically and/ionically conductive. The structure of the matrix will at least in part depend upon the amount of alkali metal haloaluminate combined with the other positive electrode components.

In specific embodiments, the positive electrode matrix is prepared by methods as described herein to form an electrolyte permeated matrix.

The term "dense" refers to a component, element or layer that exhibits no through porosity. Dense components, elements or layers of this invention exhibit ion conductivity or both ion and electron conductivity. In such dense components, transport across the membrane occurs through the lattice structure and channels in the material rather than through pores. Dense ion-conductive components, elements or layers can function as separators allowing selective passage or transport of a selected ionic species (e.g., a particular alkali metal cation, e.g., sodium cation), but not allowing direct transport of neutral species or other ions. It will be appreciated that some low level of direct transport of neutral species and/or other ions may be accommodated in the dense components, elements or layers herein without loss of function. It will be appreciated in the art, that the ion conductivity of materials used in the invention can vary with material composition, temperature, and thickness through which ions and electrons are transported.

The matrix component of this invention which is premeated with liquid electrolyte contains some level of pores through the matrix (i.e. is porous). The matrix preferably however retains sufficient mechanical strength at operating conditions to avoid unreasonable cracking or other breakdown. In specific embodiments, the pore volume of the matrix ranges from 5 to 35% and in more specific embodiments, the pore volume ranges from 5 to 25%.

In specific embodiments, sodium cation-conductive $\beta''$-alumina is useful as a dense sodium cation-conductive material. The crystalline structure of sodium cation-conductive $\beta''$alumina, which possesses the general composition $NaAl_5O_8$, is a rhombohedral spinel with an R3m space group with lattice constants of 'a'=5.614 and 'c'=33.85 A respectively.

Various alkali metal conductive (including sodium-conductive) materials are known in the art.

Additional examples of alkali metal-conductive materials include, among others: a material having the formula $A_{1+x}Zr_2Si_xP_{3-x}O_{12}$ where $0.1 \leq x \leq 3$, where A is Na, K, or Li; a material having the formula $Na_{1+x}Zr_2Si_xP_{3-x}O_{12}$ where $0.1 \leq x \leq 3$; a material having the formula $A_5BSi_4O_{12}$ where A is Na, K, or Li, and B is Y, Nd, Dy, or Sm, or mixtures thereof; a non-stoichiometric alkali-deficient material having the formula $(A_5BSi_4O_{12})_{1-\delta}(B_2O_3.2SiO_2)_\delta$, where A is Na, K, or Li, and B is Nd, Dy, or Sm, or mixtures thereof and where $\delta$ is the measure of deviation from stoichiometry; a material with the formula $Li_{1+x}Al_xTi_{2-x}(PO_4)_3$ or $Li_{1.3}Al_{0.3}Ti_{1.7}(PO_4)_3$. Alternatively, the alkali metal conducting material can be a layered alkali ion conducting ceramic-polymer composite membrane, having alkali ion-selective polymers layered on alkali ion conducting ceramic solid electrolyte materials. Alternatively, the alkali metal-conducting material is a NaSICON, KS ICON or LiSICON membrane available from Ceramatec, Inc (Salt Lake City, Utah). Other types of alkaliion conductive substantially non-porous separators may also be used in the invention. U.S. Pat. No. 8,343,661 provides additional description of alkali-metal conducting materials useful as separators in the cells of this invention. This patent is incorporated by reference herein for this description.

The positive electrode of the invention comprises a transition metal chalogenide. The term transition metal chalcogenide refers herein to a chemical compound having at least one chalcogen anion and one or more transition metals. Herein the term chalcogen refers to sulfides, selenides, and tellurides, but does not refer to oxides.

The cell and batteries of the invention employ a liquid alkali metal negative electrode. In general the electrode can comprise any alkali metal or mixture thereof. It will be appreciated that the choice of alkali metal in the negative electrode must be consistent with the choice of electrolyte such that alkali metal ions are transported to the positive electrode. The liquid alkali metal negative electrode is preferably a liquid sodium electrode. Various liquid alkali metal electrodes are known in the art. U.S. Pat. No. 8,343,661 provides additional description of liquid alkali metal electrodes useful in the cells of this invention, including additives which can affect electrode performance. This patent is incorporated by reference herein for this description.

The cells and batteries of this invention operate over the temperature range 150-300° C., more specifically operate over the temperature range of 200 to 300° C. and yet more specifically at temperatures of and between 225 to 275° C.

A schematic illustration of an energy storage cell 20 of this invention is provided in FIG. 1. An exemplary cell (20) comprises a positive electrode (2) and a negative electrode (3) formed within an appropriate conductive housing (battery case) 1 and the electrodes are separated by a dense alkali metal-conducting separator 10 which functions as a solid electrolyte. The negative electrode is formed of alkali metal (4) which is liquid at cell operating temperatures. The liquid alkali metal is contained within a negative electrode compartment formed between the housing (1) inner wall and separator 10. The positive electrode compartment optionally contains an electrical conductor (5), which may be a porous material, such a carbon felt, to improve electrical connection between the separator (10), liquid alkali metal (4), the housing (1), cap (25) and negative cell terminal (27).

The positive electrode (2) comprises a solid matrix (6) containing transition metal chalcogenide as the positive electroactive material electrically connected via a current collector (e.g., 19) to the cell negative terminal (29). Electrical connection to the negative terminal can be via a feed through (21) in housing cap (25). The solid matrix (6) is preferably formed within an electrically conductive mesh (8) which substantially retains positive electroactive material. A reservoir of alkali metal haloaluminate which is liquid at cell operating temperatures (9) functions as a liquid electrolyte between separator (10) and the positive electrode (2). The cell embodiment of FIG. 1 is specifically illustrated with a tubular cell geometry where a tube formed of dense alkali metal-conductive electrolyte (separator 10) also serves to contain the positive electrode material within positive electrode (2) and the liquid metal salt electrolyte (9).

In the illustrated tubular cell embodiment of FIG. 1, the separator tube (10) is inserted into the cell housing (1) and supported and positioned therein with one or more supports (11, 12). The separator tube (10) is positioned within the housing and spaced away from the inner wall of the housing to form a negative electrode compartment surrounding the separator tube for receiving alkali metal (4). The separator tube (10) may be positioned symmetrically within housing (1). In this embodiment, the positive electrode (2) is supported and positioned within the separator tube (10) and spaced away from the inner wall of the separator tube employing one or more supports (13) forming a positive electrode compartment for receiving liquid electrolyte (6).

In a specific embodiment, current collection from the positive electrode (2) is accomplished using a conductive element (19) embedded into the matrix of the positive electrode. The conductive element may be in the form of a wire or ribbon. In a preferred embodiment, the conductive element extends throughout the porous matrix. In a specific embodiment, as illustrated in FIG. 1, the conductive element is in the form of a conductive brush with a plurality of brush elements (22) extending from a conductive stem (23). The positive electrode matrix can contain a dispersed electrically conductive material, such as carbon.

Figure 2:
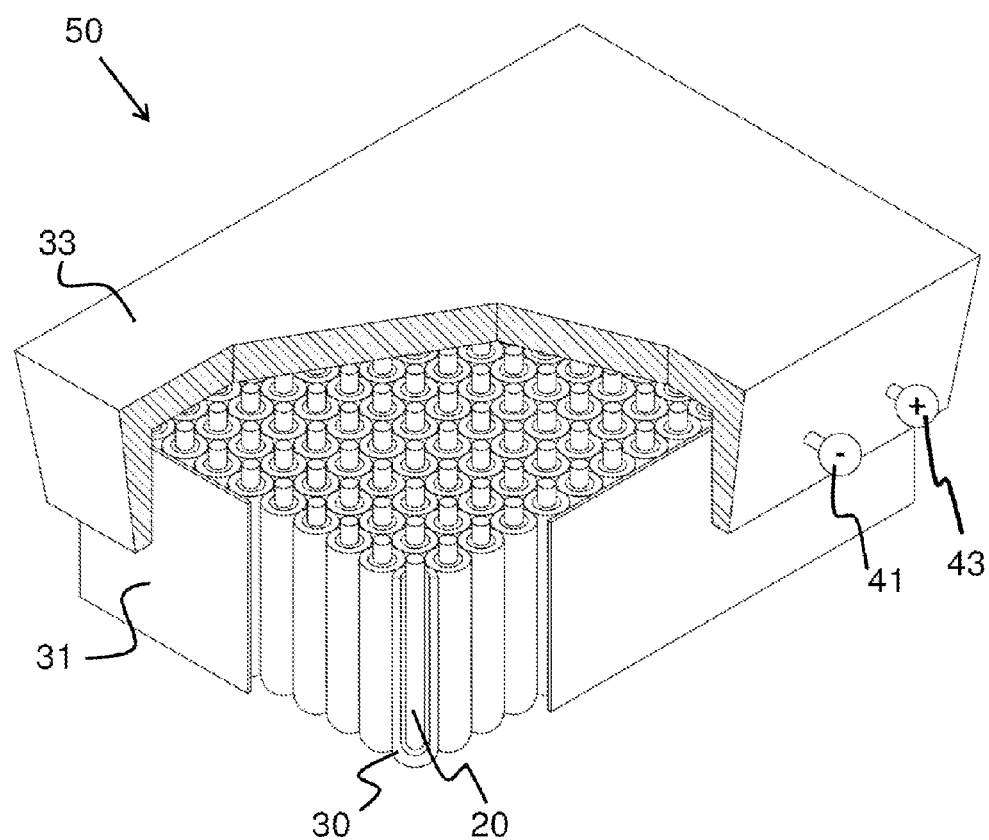
FIG. 2 is a schematic illustration of an exemplary multi-cell battery of this invention. The battery is exemplified with a plurality of tubular geometry cells as described in FIG. 1.

Batteries of the invention comprise one or more storage cells of the invention, electrically connected in series or in parallel as is known in the art. FIG. 2 provides a schematic illustration of an exemplary battery (50) of the invention. The battery is illustrated as comprising a plurality of cells of the invention (20). As is understood in the art dependent upon voltage and current requirements in a given application the cells may be electrically connected in series or in parallel. Electrical connection of the cells is not shown in FIG. 2. The illustrated battery is formed within a battery housing, which can be a two part housing with a base container (31) and a cover (33). Such a battery housing can be sealed employing any appropriate art-recognized method. Alternatively, the battery housing may be unitary. Battery terminals (positive 43 and negative 41) are provided through the battery housing. These battery terminals are electrically connected to appropriate terminals of the cells within the battery.

Supports (30) are optionally provided within the battery housing for one or more of the cells therein. Such supports optionally provide thermal insulation. The battery may be cooled or heated to maintain a desired operating temperature, for example, by contact of a cooling (or warming) liquid with the cells or the housing or by introducing one or more channels into and through the housing for carrying a cooling liquid. The battery can be provided with thermal control including a temperature sensor to maintain a selected temperature. Various means for heating or cooling of the battery or cells therein can be employed.

Structural components of the cells and batteries (e.g., cases, housings, caps, spacers, containers or receptacles) of the invention are made of materials compatible with the operating temperatures of the cells and the compounds or compositions (e.g., liquid alkali metal, liquid electrolyte and positive electroactive material) with which they come into contact, particularly at cell operating temperatures. Compatibility generally means that the components of the cells and batteries retain integrity and mechanical strength as needed in contact with cell compounds or compositions at cell operating temperatures for example, the components do not detrimentally react with such compounds or compositions over a reasonable cell/battery lifetime. As is known in the art the materials of the components are preferably chosen to avoid undesired cracking or leakage, excessive corrosion, seal failure and/or undesired deposition on surfaces. For example, the cell housing can be mild steel, spacers can be ceramic, such as boron nitride. Current collectors, including both positive and negative electrode current collectors, can be made of any appropriate conductive material as is known in the art. For example, current collectors can be made of Pt, Pd, Mo, Au, Ni, Ti or carbon. Current collectors can be in any shape, e.g., wires, ribbons, foils, and the like.

The metal basket used in the positive electrode is preferably made of corrosion resistant metal, particularly a corrosion resistant alloy and more particularly a corrosion resistant Ni alloy. The corrosion resistant Ni alloy may contain Mo, Fe, Cr, among other metals. The corrosion resistant alloy may be an alloy of approximate composition (Ni62/Mo28/Fe5/Cr/Mn/Si/V0.4/C0.05) which is currently designated Hastalloy B®. The corrosion resistant alloy may be an alloy of approximate composition (Ni 31.8/Mo16/Cr14.5-16.5/Fe4-7/Co2.5/V0.35/Mn/C0.08/Si/W3.75) currently generally designated Hastalloy C-276 ®. The corrosion resistant alloy may be an alloy of composition Ni50-59/Mo16-18/Cr15.5-17.5/Fe4.5-7/W3.75-5.25/V0.2-0.4/Mn/Si/P0.04/S0.03/currently designated Hastalloy C® (Haynes International, Kokomo Ind.)

Cells and batteries of this invention are useful in a variety of applications and preferably are used for electric energy storage or electric vehicle propulsion.

In specific embodiments, the cells of the invention are cells which provide particular benefit over the currently competing sodium-sulfur or sodium-nickel chloride cells. In a specific embodiment, the metal chalcogenide electrodes, particularly metal sulfide electrodes, herein can replace sodium-polysulfide and nickel chloride electrodes in currently competing sodium-sulfur or sodium-nickel chloride cells. The reversible cathode of this invention, can for example, be combined with liquid sodium electrodes that are currently known in the art and specifically those that have been developed for sodium-sulfur and sodium-nickel chloride cells.

Cells and batteries of the present invention exhibit specific advantages over sodium-sulfur and sodium-nickel chloride cells and batteries. In the case of the sodium-sulfur system, the cells of this invention avoid potential explosion hazards associated with rupture of the β"-alumina solid electrolyte at battery operating temperature when unit activity liquid sodium and liquid sodium polysulfide would come directly into contact. No toxicity issues exist when using the cathode electroactive species in the system of this invention, compared to nickel chloride in the sodium-nickel chloride system. Nickel constitutes 62% of electroactive material cost in the sodium-nickel chloride system, in contrast, the positive electroactive material in the system of the invention are currently much less expensive. Furthermore, in all battery systems heat is generated as a result of internal resistance losses. In the case of ambient temperature batteries some provision must be made for thermal management, particularly when high discharge rates are used. In the system of this invention, this is not an issue since it will be able to comfortably absorb excess heat as a consequence of its operating range being between 150 and 300° C.

THE EXAMPLES

Cathode Preparation

A. Prepared in the Charged State

Powdered $FeS_2$, graphitized carbon and $NaAlCl_4$ are intimately mixed under inert atmosphere until the average particle size is less than 0.5 micron. The amount of carbon ranges from 5 to 15 weight percent of the mixture. The amount of $NaAlCl_4$ ranges from 10 to 20 weight percent of the mixture. $FeS_2$ ranges from 85 to 65 weight percent of the mixture. The mixture is introduced into an expanded metals mesh container. The expanded metal container has open area ranging from 5-16% and is prepared from a corrosion resistant metal alloy, such as nickel alloys, including Hastelloy® B or Hastelloy® C (Haynes International, Kokomo, Ind.). The alloy container is preferably shaped and sized to fit inside a closed-one-end thin walled (0.5 mm) alumina 5 mm i.d. tube for processing. The metal mesh container is spot welded to a current collector of the same material. In a specific embodiment, the cathode current collector is in the form of a brush with a central stem with extending filaments which is within and physically and electrically connected to the expanded metal mesh container. The current collector is preferably centrally located with the expanded metal container.

The expanded metal container with current collector containing the cathode mixture is inserted into an alumina one-end-closed tube. The entire assembly is slowly heated to about 250° C. to melt the $NaAlCl_4$ and form a heterogeneous mass of $FeS_2$ and carbon permeated with $NaAlCl_4$ within the metal container. The assembly is then slowly cooled to room temperature and the cathode assembly is removed from the alumina tube.

For example, a mixture of graphitized carbon (10 weight %), $NaAlCl_4$ (20 weight %) and $FeS_2$ (70 weight %) is intimately mixed and introduced into the container of the cathode assembly and into the alumina tube and a current collector is inserted into the mixture. The entire assembly (aluminium tube, container, current collector and mixture) is heated to 250° C. at a rate of between 25 to 100° C./hour and maintained at 250° C. for 5 hours until the NaAlCl$_4$ has completely wetted the chalcogenide cathode electroactive material. The assembly is then slowly cooled to room temperature. After the assembly is thoroughly cooled it is removed from the alumina tube by gently cracking the tube.

B. Prepared in the Discharged State

As an alternative, the cathode materials can be prepared in the discharged state by reaction of Na$_2$S with FeS to form Na$_2$FeS$_2$. Stoichiometric amounts of sodium sulfide and iron sulfide are intimately mixed in a ball mill under inert atmosphere until the average particle size is less than 0.5 micron. The resulting iron/sulfide mixture is intimately mixed with graphitized carbon (5-15 weight %) and NaAlCl$_4$ (10-20 weight %) and the resulting mixture is introduced into a crucible and heated under inert atmosphere at 350° C. for at least 5 hours to completion of reaction. Following cooling to room temperature the reaction product is milled under inert atmosphere until the average a particle size is less than 0.5 micron and reheated to 350° C. for at least 5 hours to ensure complete reaction. The reaction product is remilled and the resultant material is introduced into the metal container of the cathode assembly with current collector in place. As an alternative, the carbon can be combined and mixed with the heated treated mixture of Na$_2$S, FeS and NaAlCl$_4$ just before the material is introduced into the metal container with current collector in place. The entire assembly is introduced into a one-end-closed alumina tube and slowly is heated to 250° C. at a rate of between 25 to 100° C./hour and maintained at 250° C. for 5 hours until the NaAlCl$_4$ has completely wetted the porous chalcogenide cathode electroactive material.

Cell Assembly

Cell assembly is performed under inert atmosphere (e.g., Ar).

a. Cells Fabricated in the Charged State

Cells are fabricated using a closed-one-end β"-alumina tube (5 mm i.d.). The tube is mounted in a mild steel case. The tube is positioned symmetrically within the case and spaced from the case wall employing one or more boron nitride spacers. In a specific embodiment, the case is tubular and has an i.d. of 7.5 mm. Carbon felt or related porous conductive material, e.g., steel wool, is preferably introduced into the steel case in contact with the inside case wall and the outside wall of the β"-alumina tube. The assembled components are heated to 150° C. and solid sodium is added to the cavity between the case and the β"-alumina tube. The amount of alkali metal added is such that the capacity of the liquid alkali metal electrode should be about 20% greater than that of the cathode such that the cell is cathode limited and that the effective reservoir of the alkali metal chloroaluminate electrolyte between the cathode and solid electrolyte should be sufficient to directly react with liquid alkali metal in the anode in the case of cell rupture to avoid reaction of liquid alkali metal with chalcogenide in the positive electrode The cylindrical charged state cathode assembly described above is inserted into the β"-alumina tube and positioned therein using one or more boron nitride spacers. The cell assembly is then heated to 250° C. as described above. NaAlCl$_4$ is then introduced into the β"-alumina tube surrounding the cathode assembly.

B. Cells Fabricated in the Discharged State

Cells are fabricated using a closed-one-end β"-alumina tube (5 mm i.d.). The tube is mounted in a mild steel case. The tube is positioned symmetrically within the case and spaced from the case wall employing one or more boron nitride spacers. Porous carbon felt is introduced into the steel case in contact with the inside case wall and the outside wall of the β"-alumina tube. In a specific embodiment, the case is tubular and has an i.d. of 7.5 mm.

The cylindrical discharged state cathode assembly described above is inserted into the β"-alumina tube and positioned therein using one or more boron nitride spacers. The cell assembly is then heated to 250° C. NaAlCl$_4$ is then introduced into the β"-alumina tube surrounding the cathode assembly. It is not necessary to add liquid sodium to the cell assembly. The heated cell is then initially charged by application of an external applied voltage in excess of the cells final anticipated open circuit voltage (about 2.7V). During charging, sodium ions in the cathode are reduced forming liquid sodium at the anode.

Electrochemical performance of cell hardware is assessed at least in part by determining the current and voltage efficiency as well as overall rates and cycle life. Cells are operated cathode limited to determine Faradaic utilization.

Performance of batteries fabricated in the fully charged state is assessed by determining:
the overall electrochemical energy conversion efficiency as a function of operating temperature between 150 and 300° C.;
applied current density between 50 and 200 mA/cm$^2$ during charge/discharge; and
the volumetric charge capacity that can be realized from the cathode, (mAh/cm$^3$).

Discharge curves under constant current loads are measured at various practical C (drain rates) as a function of operating temperature.

Additionally, cells are subjected to extended charge/discharge cycling tests to identify evidence of degradation by cell components as a function of time. Again, this assessment is performed at nominal current densities between 50 and 200 mA/cm$^2$.

Batteries of the invention preferably can be operated for at least 100 charge/discharge cycles under constant current load without significant capacity fade.

The invention claimed is:

1. A storage cell comprising:
   a negative electrode comprising liquid alkali metal;
   a positive electrode having a matrix comprising 50% by weight or more of a transition metal chalcogenide;
   a liquid alkali metal haloaluminate electrolyte; and
   a non-porous solid alkali metal conducting separation element intermediate between the negative electrode and the liquid alkali metal haloaluminate electrolyte;
   wherein the liquid alkali metal haloaluminate electrolyte permeates the matrix of positive electrode and the transition metal chalcogenide of the positive electrode is not in direct physical contact with the solid alkali metal conducting separation element.

2. The cell of claim 1 wherein the matrix of the positive electrode is retained in the cell in a conductive container or receptacle.

3. The cell of claim 1 wherein the transition metal chalcogenide is iron sulfide.

4. The storage cell of claim 3 wherein the liquid alkali metal haloaluminate electrolyte is sodium chloroaluminate.

5. The storage cell of claim 4 wherein the matrix of the positive electrode comprises 75% by weight or more of iron sulfide.

6. The cell of claim 1 wherein the liquid alkali metal negative electrode is a liquid sodium negative electrode and the liquid electrolyte is sodium haloaluminate.

7. The cell of claim 6 wherein the electrolyte is sodium chloroaluminate.

8. The cell of claim 1 wherein the matrix of the positive electrode comprises 75 wt % of iron sulfide or more.

9. The cell of claim 1 wherein the matrix of the positive electrode further comprises carbon particles.

10. The cell of claim 1 wherein the matrix of the positive electrode comprises carbon particles ranging from 5 to 15 wt %, $NaAlCl_4$ ranging from 10 to 20 wt % and $FeS_2$ ranging from 85 to 65 wt %.

11. A battery comprising a plurality of cells of claim 1.

12. A method for generating energy, comprising forming one or more cells of claim 1 and discharging the one or more cells.

13. The method of claim 12 further comprising a step of storing electrical energy wherein the one or more cells are rechargeable and wherein after discharge the one or more cells are recharged by application of a voltage to the cell.

14. The storage cell of claim 1 wherein the matrix of the positive electrode comprises 75% by weight or more of the transition metal chalcogenide.

15. The storage cell of claim 14 wherein the transition metal chalcogenide is iron sulfide.

16. The storage cell of claim 1 wherein the non-porous, alkali metal cation-conductive solid electrolyte is in the form of a tube and the matrix of the positive electrode is inside of the tube and the liquid alkali metal of the negative electrode is on the outside of the tube.

17. The storage cell of claim 16 wherein the matrix of the positive electrode is retained in a conductive container or receptacle.

18. The storage cell of claim 16 wherein the transition metal chalcogenide is iron sulfide and the metal haloaluminate electrolyte is sodium chloroaluminate.

19. The storage cell of claim 16 wherein the matrix of the positive electrode comprises carbon particles ranging from 5 to 15 wt %, $NaAlCl_4$ ranging from 10 to 20 wt % and $FeS_2$ ranging from 85 to 65 wt %.

20. A method for producing a storage cell comprising:
forming a negative electrode comprising liquid alkali metal;
forming a positive electrode comprising a matrix of 50% by weight or more of transition metal chalcogenide permeated with a liquid alkali metal haloaluminate electrolyte;
positioning a non-porous, alkali metal cation-conductive solid electrolyte between the negative electrode and the positive electrode;
providing a liquid alkali metal haloaluminate electrolyte in physical and electrical contact between the alkali metal cation-conductive solid electrolyte and the matrix of the positive electrode.

21. The method of claim 20 wherein the matrix of the positive electrode is formed by combining alkali metal haloaluminate with the transition metal chalcogenide and heating the mixture to melt the alkali metal haloaluminate.

22. The method of claim 20 wherein the transition metal chalcogenide is iron sulfide.

23. The method of claim 20 wherein the alkali metal haloalumoinate is sodium chloroaluminate.

24. The method of claim 20 wherein the matrix is formed within a conductive container or receptacle.

25. The method of claim 20 wherein the matrix is formed having an embedded current collector.

26. The method according to claim 20 wherein the cell is rechargeable.

27. The method according to claim 20 wherein the alkali metal is sodium.

28. The method of claim 20 wherein the matrix of the positive electrode comprises 75% by weight or more of transition metal chalcogenide.

29. The method of claim 28 wherein the transition metal chalcogenide is iron sulfide.

30. The method of claim 28 wherein the alkali metal haloalumoinate is sodium chloroaluminate.

* * * * *